US009087343B2

(12) United States Patent
Carr et al.

(10) Patent No.: US 9,087,343 B2
(45) Date of Patent: Jul. 21, 2015

(54) METHOD AND APPARATUS FOR DEMONSTRATING THE EXPOSURE OF CONSUMERS TO MEDIA CONTENT AND TO ADVERTISEMENTS WHICH ARE DELIVERED OVER A NETWORK

(71) Applicant: ART19, Inc., San Rafael, CA (US)

(72) Inventors: Sean Abram Carr, West Hollywood, CA (US); Johannes Vetter, Vancouver (CA); William Matthew Ridley, London (GB)

(73) Assignee: ART19, Inc., San Rafael, CA (US)

( * ) Notice: Subject to any disclaimer, the term of this patent is extended or adjusted under 35 U.S.C. 154(b) by 0 days.

(21) Appl. No.: 14/304,117

(22) Filed: Jun. 13, 2014

(65) Prior Publication Data

US 2014/0373049 A1    Dec. 18, 2014

Related U.S. Application Data

(60) Provisional application No. 61/835,150, filed on Jun. 14, 2013.

(51) Int. Cl.
*H04N 7/16* (2011.01)
*H04N 7/10* (2006.01)
*G06Q 30/02* (2012.01)
*H04N 21/81* (2011.01)
*H04N 21/258* (2011.01)
*H04N 21/432* (2011.01)
*H04N 21/442* (2011.01)
*H04N 21/658* (2011.01)

(52) U.S. Cl.
CPC ..... *G06Q 30/0244* (2013.01); *H04N 21/25866* (2013.01); *H04N 21/4325* (2013.01); *H04N 21/44222* (2013.01); *H04N 21/6582* (2013.01); *H04N 21/812* (2013.01)

(58) Field of Classification Search
CPC .......... H04H 60/43; H04H 20/14; H04N 2007/17372; H04N 21/812
USPC .................................. 725/14, 16, 22, 32, 34
See application file for complete search history.

(56) References Cited

U.S. PATENT DOCUMENTS

2008/0046919 A1* 2/2008 Carmi et al. ................. 725/32
2009/0313111 A1* 12/2009 Westerinen et al. ....... 705/14.35

* cited by examiner

*Primary Examiner* — Sumaiya A Chowdhury
(74) *Attorney, Agent, or Firm* — Samantha Midkiff

(57) ABSTRACT

One embodiment of a system (3) that provides more than one technique for delivering media and advertisements to consumers (26a) and consumers (26b) over a network (23) and, where a technique permits, measuring the exposure of consumers (26a) and (26b) to the media and advertisements with precision and, where a technique does not permit, using exposure information from other techniques to demonstrate consumer (26a) and (26b) exposure to the media and advertisements. Advantageously, offline consumer (26b) exposure to downloaded media content and advertisements can be demonstrated, which significantly increases the attractiveness of downloaded media content to advertiser (5).

3 Claims, 2 Drawing Sheets

METHOD AND APPARATUS FOR DEMONSTRATING THE EXPOSURE OF CONSUMERS TO MEDIA CONTENT AND TO ADVERTISEMENTS WHICH ARE DELIVERED OVER A NETWORK

CROSS-REFERENCE TO RELATED APPLICATIONS

None.

FEDERALLY SPONSORED RESEARCH

None.

SEQUENCE LISTING

None.

BACKGROUND

Previously, broadcast technology was the preferred method for distributing audio and video media content and its associated advertising. Printed paper was relied upon for distributing the written word. Advances in technology, including the internet, have provided new methods of distributing media content. Older forms of media distribution employ relatively crude methods to measure consumer exposure to media and the advertising within it, such as circulation figures and small surveys of audiences. Modern distribution technology permits more precise tracking and measurement of consumer exposure to media and the advertisements within it. Modern technology also enables advertisements to be more accurately targeted towards profiled consumers whom an advertiser seeks to reach. As a result, advertisers now expect better targeting and more precise measurement of exposure when advertising using modern technology.

Various systems and machines have been devised or proposed for delivering media that offer alternatives to traditional broadcast technology. These include distribution by dedicated cable networks and by streaming over the internet. Some of these systems involve connections back to media providers that permit media providers and advertisers to measure exposure of consumers to their media and advertisements. On occasions, these systems permit consumers to interact with the media producers or advertisers. Some allow providers to gather information about consumers so that advertisements appropriate to each consumer's interests can be directed towards them.

Many consumers prefer to download media and store it on electronic devices. The consumers are then exposed to the media and advertisements at a later time when they are not connected to the media providers. Providers can measure the number of times an item of media has been downloaded. However, the absence of a connection prevents media providers from measuring the number of times consumers have actually accessed the downloaded item, or whether they have been fully or partially exposed to the media and associated advertising. Furthermore, downloading media impedes interaction with consumers, limits the extent to which their interests can be assessed and complicates the process of targeting relevant advertisements.

In an attempt to address this problem, systems and machines have been devised that transmit details of consumers' offline exposure to media and advertisements back to the provider when the consumer re-establishes a connection. Some also transmit details of consumers' offline interaction with media or advertisements when the consumer re-establishes a connection. These systems and machines suffer from a problem. In order for a provider to obtain this information about offline consumer behavior, consumers are required to access downloaded media content through a dedicated device or software application. The widespread availability of media and the multitude of ways to access it mean that the requirement for a dedicated device or software application is a limiting factor that can prevent commercialization.

Present methods of media delivery over the internet therefore suffer from significant disadvantages. Exposure to media and advertisements that consumers access over dedicated networks, or streamed over the internet, can be measured. Exposure can also be measured when content is downloaded using a provider's dedicated device or software application that reports back offline usage. However, exposure cannot be measured when consumers access downloaded media using other devices or software applications. Many providers find the majority of consumers accessing their media through this last method and are unable to measure exposure to their content precisely. They therefore struggle to sell advertisements against it.

SUMMARY

In accordance with one embodiment, a method and an apparatus providing more than one technique for delivering media content and advertisements to consumers over a network and, where techniques permit, measuring the exposure of consumers to the media content and advertisements with precision and, where techniques do not permit, using exposure information from other techniques to demonstrate consumer exposure to media content and to advertisements.

ADVANTAGES

Accordingly, several advantages of one or more aspects are as follows:

(a) to provide a method and an apparatus for delivering an item of media content and its associated advertising to consumers in a multitude of ways according to their preference;

(b) that permits consumers to access media content and advertising while connected through a network, by downloading using a provider's dedicated software application or device, or by downloading using some alternative application or device;

(c) that furnishes a provider with data regarding the exposure of consumers to media content and advertising when it can be obtained and uses this data to demonstrate the exposure of consumers to the same media and advertising when it cannot be obtained;

(d) that in so doing furnishes media producers and advertisers with overall data regarding consumer exposure to their media content and advertisements that is more precise and often derived form larger sample sizes than traditional broadcast media audience surveys;

(e) that furnishes media providers and advertisers with data regarding the characteristics of consumers exposed to media content that can be used, for example, to facilitate the targeting of advertisements;

(f) that advantageously selects the most effective manner in which to target, insert, and deliver an advertisement within an item of media content depending upon whether a consumer has accessed it while connected through a network, by downloading using a provider's device or software application, or by downloading through an alternative application or device.

These and other advantages of one or more aspects will become apparent from a consideration of the drawings and ensuing description.

DRAWINGS—FIGURES

Corresponding reference characters indicate corresponding parts throughout the drawings.

Figure 1:
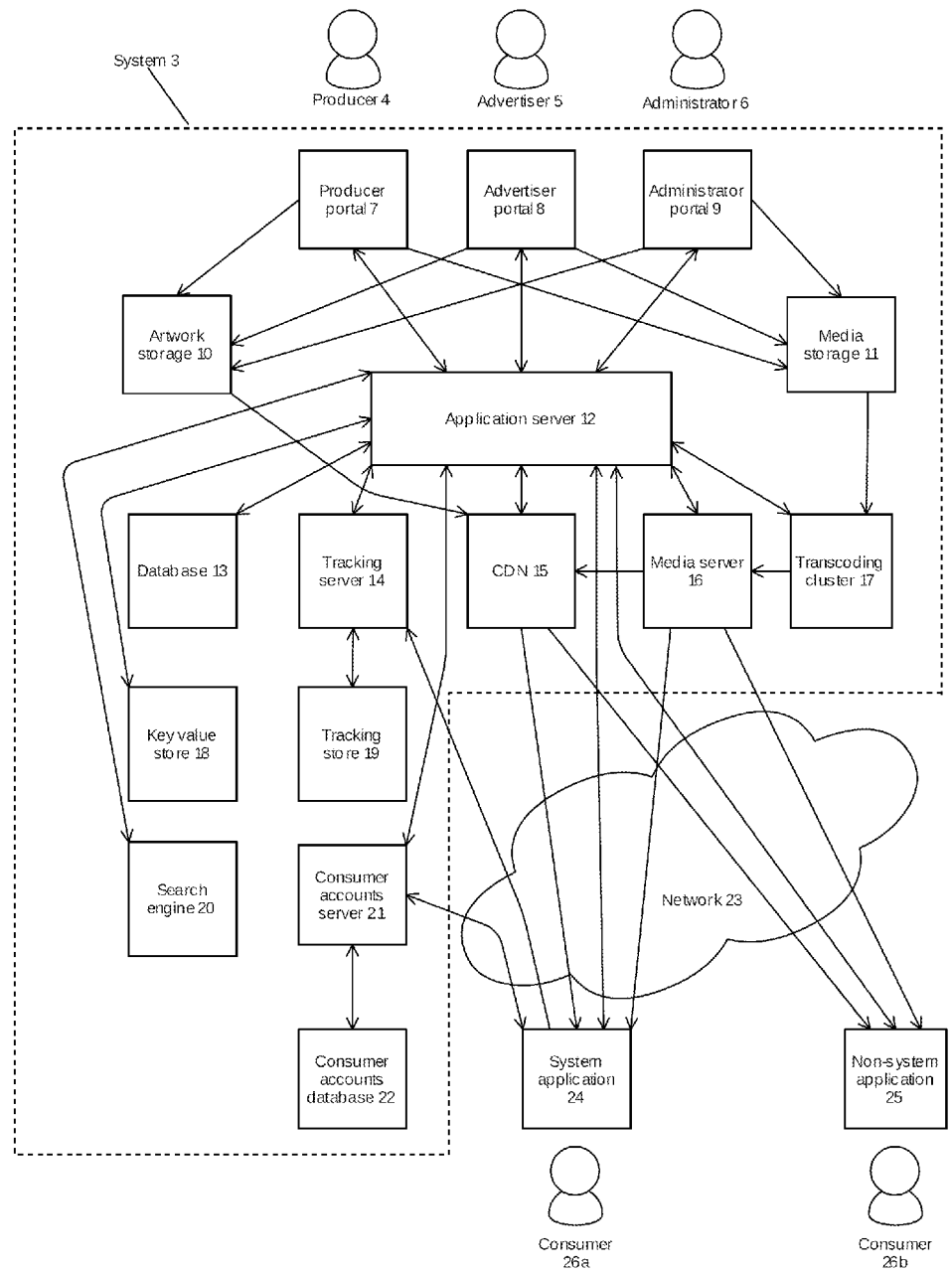
FIG. 1 is a block diagram illustrating one example of a suitable computing system environment in which aspects of the embodiment can be implemented.

DRAWINGS—REFERENCE NUMERALS 3 system
4 producer
5 advertiser
6 administrator
7 producer portal
8 advertiser portal
9 administrator portal
10 artwork storage
11 media storage
12 application server
13 database
14 tracking server
15 CDN
16 media server
17 transcoding cluster
18 key value store
19 tracking store
20 search engine
21 consumer accounts server
22 consumer accounts database
23 network
24 system application
25 non-system application
26
a. consumer (using system application 24)
b. consumer (using non-system application 25)
27
a. media content file (when delivered using system application 24)
b. media content file (when delivered using non-system application 25)

DETAILED DESCRIPTION

FIG. 1 shows an overall view of one embodiment. In accordance with this embodiment, the view shows a method and an apparatus that supports more than one technique for delivering media and advertisements to consumers using the internet and, where a technique permits, measuring the exposure of consumers to the media and advertisements with precision and, where a technique does not permit, using exposure information from other techniques to demonstrate consumer exposure to the media and advertisements.

A system 3 includes a producer portal 7. Producer portal 7 is an interface or web application for a producer 4 to upload media files and associated information. Producer 4 is one or more individuals who create and manage media content including, for example, audio, video, written word, or other media. Producer portal 7 is connected to an artwork storage 10 with one or more suitable connections. Those skilled in the art are familiar with the methods used to establish and maintain suitable computer connections of this kind. In the present embodiment it is envisaged that the connection is capable of permitting users to upload files onto artwork storage 10 using a web interface, File Transfer Protocol (FTP), or other suitable methods. Artwork storage 10 is a computer storage device for raw image files to be associated with media files. In one embodiment, artwork storage 10 is cloud-based storage. However, artwork storage 10 can be any suitable device capable of storing computer files. Producer portal 7 is additionally connected to an application server 12 with one or more suitable connections. Application server 12 is a server running a program that handles business logic within system 3 and application operations between other elements of the present embodiment including, for example, advertisement selection, transcoding selection, processing queries from other elements of system 3, and storing metadata, including the addresses of media files and artwork files. In one embodiment, application server 12 is a cloud-based server. However, application server 12 can be any suitable device capable of handling the processing requirements and core business logic of system 3. Producer portal 7 is additionally connected to a media storage 11 with one or more suitable connections. In the present embodiment it is envisaged that producer portal 7 is capable of permitting users to upload files onto media storage 11 using a web interface, File Transfer Protocol (FTP), or other suitable methods. Media storage 11 is a computer storage device for the media files in system 3. As an example, media storage 11 is cloud-based, but aspects of the present embodiment can be applied to any suitable computer device capable of storing computer files.

An advertising portal 2 is an interface or web application enabling an advertiser 5 to upload advertising files and associated information including, for example, desired targeting or pricing. Advertiser 5 is one or more individuals who manage audio, video, text or other advertising that can be inserted within media content. Advertising portal 2 is connected to artwork storage 10. Those skilled in the art are familiar with the methods used to establish and maintain suitable computer connections of this kind. Advertising portal 2 is additionally connected to application server 12 with one or more suitable connections and to media storage 11 with one or more suitable connections.

An administrator portal 9 is an interface or web application enabling an administrator 6 to oversee the system. Administrator 6 is one or more individuals who has access to system 3, manages system 3 technology, and offers support to producer 4 and advertiser 5. Administrator portal 9 is connected to artwork storage 10 with one or more suitable connections. In the present embodiment it is envisaged that it is capable of permitting users to upload files onto artwork storage 10 using a web interface, File Transfer Protocol (FTP), or other suitable methods. Administrator portal 9 is additionally connected to application server 12 with one or more suitable connections. Administrator portal 9 is additionally connected to media storage 11 with one or more suitable connections. In the present embodiment it is envisaged that it is capable of permitting users to upload files onto media storage 11 using a web interface, File Transfer Protocol (FTP), or other suitable methods.

Artwork storage 10 is additionally connected to a CDN 15 with one or more suitable connections. In one embodiment, CDN 15 is a geographically distributed content delivery network of edge servers that pull media files from a media server 16 with one or more suitable connections, store these files redundantly, and determine the optimal location from which to deliver these files to, for example, client applications. However, CDN 15 can be any suitable network of computer devices capable of fulfilling these functions. Media server 16 is a computer storage device that stores transcoded media files with unique addresses. As an example, media server 16 is cloud-based, but aspects of the present embodiment can be applied to any suitable device capable of storing computer files.

Application server 12 is additionally connected to CDN 15 and media server 16 with one or more suitable connections. Application server 12 is additionally connected to a transcoding cluster 17 with one or more suitable connections. Transcoding cluster 17 is one or more servers that pulls media content files from media storage 11, transcodes them into their final formats, and sends these final files using one or more suitable connections to media server 16 for storage and distribution processing. It is presently contemplated that transcoding cluster 17 consists of cloud based infrastructure that enables rapid scaling such as, for example, a dynamic number of EC2 instances within Amazon Web Services. When there is heavy demand, additional servers can be employed, and when demand lessens, they can be deactivated. This offers improved performance and efficiency. However, aspects of the present embodiment can be applied to any suitable computer device, or arrangement of computer devices, capable of fulfilling these functions. Transcoding cluster 17 is additionally connected to media storage 11 with one or more suitable connections.

Application server 12 is additionally connected to a database 13 with one or more suitable connections. Database 13 is a relational database in which all data associated with media is stored including, for example, summary details and addresses of stored media and artwork. As an example, database 13 is a PostgreSQL database running on a cloud-based server, but aspects of the present embodiment can be applied to any suitable application on any suitable computer device capable of storing this type of data.

Application server 12 is additionally connected to a key value store 18 with one or more suitable connections. Key value store 18 is a non-relational database in which all data associated with media is stored including, for example, summary details and addresses of stored media and artwork. As an example, key value store 18 is an advanced key-value store running on a cloud-based server, often referred to as a data structure server, such as for example, Redis, but aspects of the present embodiment can be applied to any suitable application on any suitable computer device capable of storing this type of data.

Application server 12 is additionally connected to a search engine 20 with one or more suitable connections. Search engine 20 is an internal search engine in which application server 12 stores data in order to make it rapidly searchable by other elements within the present embodiment. In one embodiment, search engine 20 is an Elasticsearch application running on a cloud-based server. However, search engine 20 can be any search engine application running on any suitable computer device that is capable of fulfilling these functions.

Application server 12 is additionally connected to a tracking server 14 with one or more suitable connections. Tracking server 14 is a server that tracks, for example, consumer information, consumer exposure to media content, and consumer exposure to advertising. In one embodiment, tracking server 14 is an application on a cloud-based server. However, tracking server 14 can be any suitable application on any suitable computer device capable of fulfilling these functions.

Tracking store 19 is a computer device in which tracking server 14 stores user data concerning consumer 26a and consumer 26b. In one embodiment, tracking store 19 is an advanced key-value store, often referred to as a data structure server, such as for example, Redis. However, tracking store 19 can be PostgreSQL or any suitable database application on any suitable computer device capable of performing these functions. Tracking store 19 is connected to tracking server 14 with one or more suitable connections.

Application server 12 is additionally connected, through a network 23, to a system application 24 within one or more client computing devices with one or more suitable connections. System application 24 is a client application that is controlled by, and communicates regularly with, system 3. System application 24 provides a consumer 26a with lists of available media content and enables consumer 26a either to access this content while connected through network 23 or to download it over network 23 and to access it once disconnected. Consumer 26a is one or more individuals who consume the media content and advertising that are delivered by system application 24. System application 24 can also dynamically control insertion and delivery of advertisements within this media content. System application 24 can exist within a multitude of client computing devices, including but not limited to mobile phones, tablets, car dashboards, desktop computers, SmartTVs, and game consoles. While these devices are not separately shown on FIG. 1 it should be understood that system application 24 refers both to the computing device and to the software within it. System application 24 is additionally connected to tracking server 14 with one or more suitable connections. The connections between system application 24 and all other elements of the present embodiment are through network 23. Network 23 is, as an example, the internet (or the world wide web). However, aspects of the present embodiment can be applied to any data communication network. It is to be appreciated that a number of wired and wireless formats are available enabling communication between elements and network 23.

Application server 12 is additionally connected, via network 23, to a non-system application 25 within one or more client devices with one or more suitable connections. Non-system application 25 is a completely independent third party client application that uses web feeds to provide a consumer 26b with lists of available media content and the ability to download these media content files. Consumer 26b is one or more individuals who consume media content and advertising that are delivered by non-system application 25. Non-system application 25 communicates with system 3 by accessing web feeds generated by application server 12. Non-system application 25 can exist within a multitude of client devices, including but not limited to mobile phones, tablets, car dashboards, desktop computers, SmartTVs, and game consoles. While these devices are not separately shown on FIG. 1 it should be understood that non-system application 25 refers both to the computing device and to the software within it. The connections between Non-system application 25 and all other elements of the present embodiment are through network 23.

CDN 15 is additionally connected to system application 24 within one or more client devices with one or more suitable connections and to non-system application 25 within one or more client devices with one or more suitable connections. Media server 16 is additionally connected to system application 24 within one or more client devices with one or more suitable connections and to non-system application 25 within one or more client devices with one or more suitable connections.

A consumer accounts server 21 is a server that handles consumer accounts creation and login. In one embodiment, consumer accounts server 21 is an application on a cloud-based server. However, consumer accounts server 21 can be any suitable application on any suitable computer device capable of fulfilling these functions. Consumer accounts server 21 is connected to application server 12 with one or more suitable connections, to a consumer accounts database 22 with one or more suitable connections, and to system application 24 within one or more client devices with one or more suitable connections.

Consumer accounts database 22 is a database in which consumer accounts server 21 stores all data associated with consumer accounts. As an example, consumer accounts database 22 is a PostgreSQL database running on a cloud-based server, but aspects of the present embodiment can be applied to any suitable application on any suitable computer device capable of performing these functions.

Figure 2:
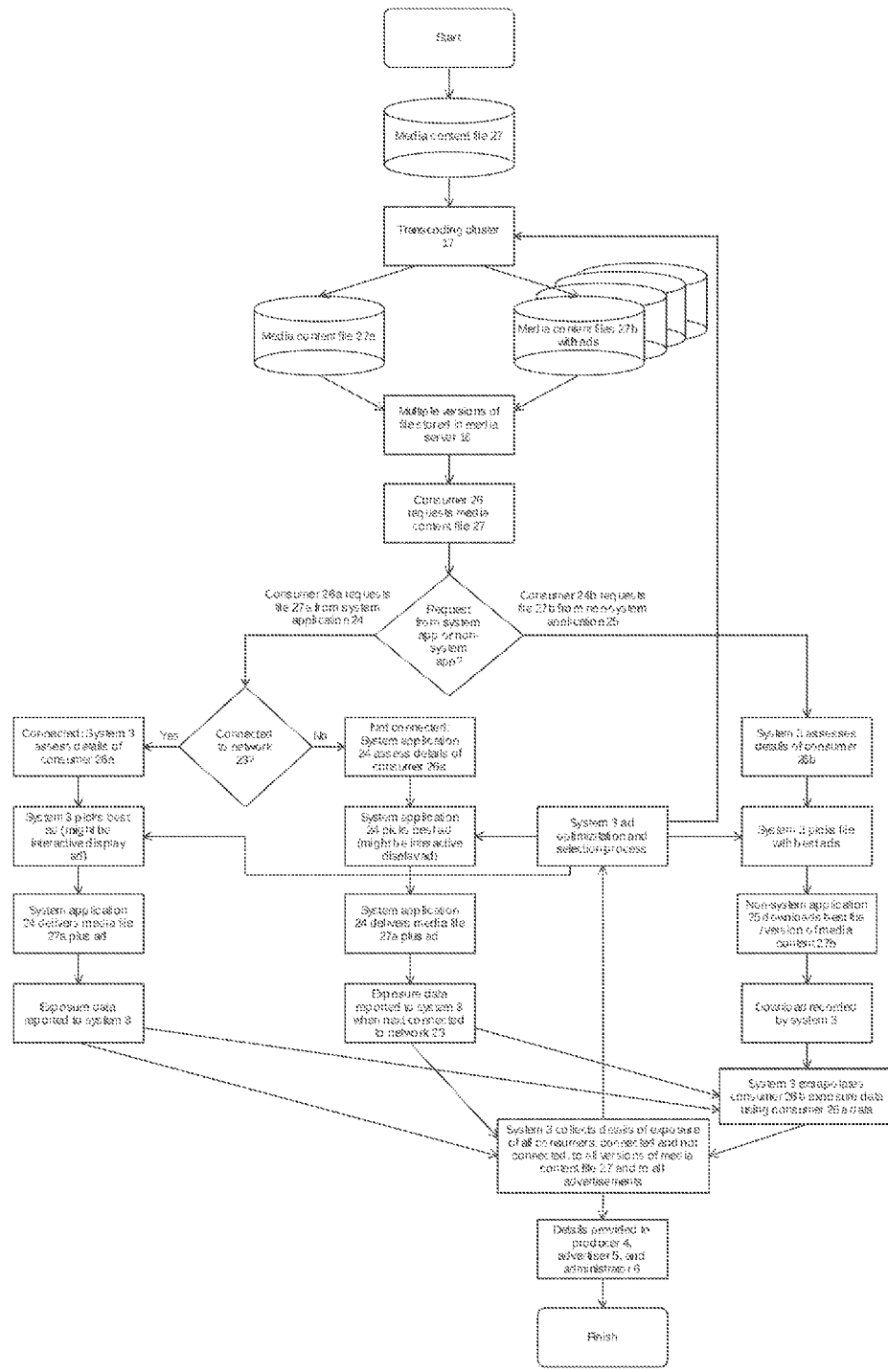
FIG. 2 is an exemplary flowchart illustrating the delivery of media content and advertisements and the measurement of consumers' exposure to the media content and advertisements according to aspects of the embodiment.

FIG. 2 is an exemplary flowchart illustrating the delivery of a media content file 27 and associated advertisements and the measurement of the exposure of consumer 26a and consumer 26b to media content file 27 and associated advertisements.

Operation

Media Content Upload:

Using producer portal 7, producer 4 conducts the following steps in the media content upload process:

1. Using producer portal 7, producer 4 uploads a media content file onto media storage 11. When the process is complete, producer portal 7 provides application server 12 with the file's address in media storage 11.

2. Using producer portal 7, producer 4 uploads artwork to be associated with the media content file onto artwork storage 10. When the process is complete, producer portal 7 provides application server 12 with the file's address in artwork storage 10.

3. Using producer portal 7, producer 4 submits metadata to be associated with the media content file, including, for example:

a. Information relevant to advertiser 5 and consumer 26, such as genres, topics, keywords, people, and whether the media content is explicit or not, b. Markers on a timeline that identify acceptable advertisement insertion points in the media content, c. Markers on a timeline that trigger a specific interactive display on system application 24.

4. Application server 12 stores the metadata, along with the media content and artwork file addresses, in database 13, in key value store 18, and in search engine 12.

Advertisement Upload:

The advertisement upload process is similar to the media content upload process. Using advertising portal 2, advertiser 5 conducts the following steps in the advertisement upload process:

1. Using advertising portal 2, advertiser 5 uploads an advertisement media file onto media storage 11. When the process is complete, advertising portal 2 provides application server 12 with the file's address.

2. Using advertising portal 2, advertiser 5 uploads artwork to be associated with the advertisement file onto artwork storage 10. When the process is complete, advertiser portal 8 provides application server 12 with the file's address.

3. Using advertising portal 2, advertiser 5 submits metadata to be associated with the advertising file, including, for example:

a. Identifying information, b. Details of the run of the advertisement including, for example, start date and time and end date and time, c. Times of day to deliver the advertisement, d. Geographical targets for the advertisement, which can be as broad as countries and as granular as zip codes, e. Demographic targets for the advertisement including, for example, details of age, gender, income, and education, f. Media content to associate the advertisement with, which can be a specific item of media content or broader in scope, such as, for example, media content within a certain genre or media content that is not explicit.

g. Custom metrics for the delivery of the advertisement including, for example, weather, pollen count, or stock market performance.

h. The desired number of consumer 26a and consumer 26b to expose to the advertisement to (Reach).

i. The desired frequency of exposure to the advertisement for each consumer 26a and consumer 26b (Frequency).

j. Spending information about the advertisement including, for example, cost per mille and maximum total spend.

4. Application server 12 stores the metadata, along with the advertisement and artwork addresses, in database 13, in key value store 18, and in search engine 20.

Transcoding and Embedding Advertisements into Media Content for Non-System Application 25:

Media content can be transcoded into multiple formats for distribution. The process follows these steps:

1. Application server 12 maintains a list of all transcoding tasks to be performed on the media file, which can be referred to as a message queue.

2. Transcoding cluster 17 pulls a task from the message queue on application server 12.

3. Transcoding cluster 17 pulls the appropriate file from media storage 11 and performs the transcode requested in the task.

4. Transcoding cluster 17 places the final transcoded file on media server 16.

5. Transcoding cluster 17 reports back to application server 12 with the transcoded media file's address on media server 16.

By using multiple codec formats for compressing digital data, system 3 can ensure that a wide range of files and client devices are supported. It is presently contemplated that in this embodiment, for example, video employs H264/MP4 and Ogg Vorbis, audio employs MP4/AAC for system application 24 and audio employs MP3 for non-system application 25. However, different and additional codec formats can also be employed and the digital rights management ("DRM") implementation of media server 16 can employ such additional codec formats.

All files of all codec formats that are used for delivering content to system application 24 are encoded into multiple bitrates. It is presently contemplated that, for example, video files have three quality levels and audio files two but other numbers of levels can be used. If system application 24 detects that its connection to system 3 is not sufficient to maintain high quality, it can switch down to a lower quality. This also enables ramping at the beginning of media content delivery to reduce launch time. In this case, the low quality version is delivered until there is enough of a buffer, at which point the high quality version takes over. This bitrate switching is enabled by media server 16, which breaks each file down into short segments. This process is sometimes referred to as chunking.

A single bitrate is used for a file that is prepared for downloading using a web feed by non-system application 25. Dynamic advertisement insertion is not supported on non-system application 25 but media content files can be prepared with advertisements pre-embedded into them for delivery by non-system application 25. We can refer to such a media file containing both media content and pre-embedded advertisements as a "non-system media file". Application server 12 will request the preparation of many versions of a non-system media file representing a single version of an original media content file. This enables system 3 to deliver different sets of advertisements to different consumers 26b within a single item of media content. The choice of which version of the non-system media file to deliver is based on information about a specific consumer 26b available from the request. This information can include, for example, internet protocol address location (GeoIP) and can also include additional information from CDN 15 and, for example, a mobile carrier.

Application server 12 will also ensure that non-system media files are refreshed on a regular basis with high value advertisements. Since all original media content files are stored permanently on media storage 11, refreshing non-system media files is identical to the above workflow with the exception of omitting step 1. Application server 12 simply adds an encoding request to the message queue and it is picked up by transcoding cluster 17. The ad logic employed by system 3 is the process by which application server 12 makes decisions about which advertisements to deliver and is described later.

Advertising in Conjunction with System Application 24:

System application 24 locally stores and regularly refreshes a multitude of advertisements in an arrangement referred to as advertisement caching. When system application 24 is downloaded for the first time or when it is updated it is pre-populated with a set of these cached advertisements. System application 24 also maintains communication with application server 12 and when connected via network 23 it routinely refreshes its cached ads with high value advertisements in the background. The purpose of this is twofold. First, it enables system application 24 to insert advertisements dynamically during offline consumption of downloaded media content. Second, it frees up device bandwidth if an advertisement requested for delivery is already cached.

The process follows these steps:

1. System application 24 is downloaded or updated by consumer 26a and system application 24 receives a set of cached advertisements as part of this process.

2. System application 24 regularly polls application server 12, checking whether there are higher value advertisements it should cache.

3. If application server 12 determines that there are higher value advertisements available, it provides system application 24 with the addresses of these advertisements in media server 16 or CDN 15.

4. In the background, system application 24 downloads these advertisements from media server 16 or CDN 15 and caches them.

5. System application 24 deletes the lowest value advertisements it has cached to keep the size of cached ads under its maximum allotted storage.

It should be noted that discrete sets of advertisements are custom selected for caching in each client device of each individual consumer 26a. The ad logic used by application server 12 to target advertisements towards specific consumers is discussed later.

When system application 24 is delivering media content, metadata tells system application 24 to pause at certain points to deliver an advertisement. The process by which system application 24 determines which advertisement to deliver differs depending upon whether it is connected to network 23 (online) or whether it is not connected (offline). The online process is as follows:

1. System application 24 issues a request to application server 12 for the highest value advertisement. It is presently contemplated that this is done in advance of reaching the advertisement insertion point so that the advertisement can be buffered and consumer 26a experiences no delay.

2. Application server 12 processes the request and returns an address for an advertisement.

3. If system application 24 already has the advertisement cached, it delivers it directly.

4. If not, system application 24 submits a request to application server 12. Application server 12 redirects the request by system application 24 to media server 16 or CDN 15.

When system application 24 is offline, the process whereby it selects which advertisement to deliver is as follows:

1. System application 24 selects the highest value advertisement it has cached.

2. System application 24 delivers the cached advertisement.

System Application 24 Media Delivery:

Consumer 26a has a variety of ways to select media content for delivery within system application 24. Additionally, there are mechanisms by which either application server 12 or system application 24 can suggest media content for delivery to a specific consumer 26a. Those skilled in the art are familiar with the methods by which media content suggestion and targeting can sometimes be automated.

In addition to online access, consumer 26a can select to download media content prior to consuming it within system application 24. This enables offline consumption, can curtail mobile bandwidth fees, and can ensure high quality. It should be noted that when system application 24 downloads media content, it does not receive a non-system media file with pre-embedded advertisements. Instead it receives a clean media content file with metadata for advertisement insertion. The location in which system application 24 stores this downloaded content can be referred to as the download repository.

The process by which system application 24 delivers requested media content when offline is as follows:

1. If the requested media content is available in its download repository, system application 24 delivers back the media content to consumer 26a. If the requested media content is not available in its download repository, system application 24 returns a notification to consumer 26a that system application 24 is required to be online for delivery of the requested media content.

The process by which system application 24 delivers requested media content when online is as follows:

1. System application 24 checks to see if the requested content is stored in its download repository. If so, it delivers it back from there and the process is complete.

2. If the requested content is not stored in its download repository, system application 24 submits a request to application server 12. Application server 12 redirects the request by system application 24 to media server 16 or CDN 15. System application 24 delivers the media content from media server 16 or CDN 15.

Dynamic Interactive Display:

In the same way system 3 uses markers placed in media content files to insert advertisements dynamically into media content, system 3 can also trigger interactive display in system application 24 at designated markers within media content files.

Interactive display advertisements enable consumer 26a to respond directly to messaging within media content or advertisements. Interactive display advertisements can be used by producer 4 or advertiser 5 to communicate with consumer 26a for a wide variety of purposes including, for example, to facilitate merchandise sales, ticket sales, sample requests, consumer surveys, newsletter sign-ups, links to websites, or for media content related casual gaming.

The contents of an interactive display advertisement can be optimized to suit the computer device in which system application 24 resides. For example, desktop computers typically have larger screens than mobile phone devices and can accommodate more display information in an interactive display advertisement. For all devices it is presently contemplated that interactive display advertisements can contain content including, for example, text, images, links, and buttons that permit consumer 26a to interact with producer 4 or advertiser 5.

Advantageously, system 3 includes an integrated ecommerce platform. The features that the ecommerce platform supports include, for example, reference transactions and one-tap interactions for purchasing. This dramatically reduces the barrier to impulse transactions.

The process by which these interactive display advertisements are created and delivered is as follows:

1. Producer 4 or advertiser 5 creates an interactive display advertisement within producer portal 7 or advertising portal 2. The interactive display advertisement is stored in database 13 and, if there are images, in artwork storage 10.

2. During the upload process, producer 4 or advertiser 5 adds a marker within a media content file or advertisement media file to trigger this interactive display advertisement at a designated point. Producer portal 7 and advertiser portal 8 enable producer 4 or advertiser 5 to insert such markers within the media content or advertisement.

3. If system application 24 downloads a media content file or advertisement media file containing a marker for an interactive display advertisement, it also downloads the relevant interactive display advertisement and artwork assets.

4. If during delivery of media content or an advertisement in system application 24 a relevant marker is hit, the interactive display advertisement displays for the specified time.

5. If consumer 26a is online, application server 12 processes any response immediately.

6. If consumer 26a is offline, an offline routine that is programmed into the interactive display advertisement is triggered. This routine can include, for example, a simple message to reconnect, or it can offer a series of interactions that can be processed when consumer 26a is next online.

7. System application 24 reports all behavior or lack of behavior related to the interactive display advertisement back to tracking server 14.

8. Tracking server 14 stores this data in tracking store 19.

Non-System Media File Delivery Using Non-System Application 25:

Non-system application 25 delivers non-system media files to consumer 26b as follows:

1. Application server 12 publishes a web feed with data about the non-system media file, including, for example, the address for retrieving the file.

2. When non-system application 25 wishes to retrieve media content from the web feed, it sends a request to application server 12, using the address in the web feed. This request comes from a specific internet protocol address that can identify the location of consumer 26b.

3. Application server 12 attempts to collect more information about the consumer 26b from CDN 15, which can have additional data, for example, from the mobile carrier of consumer 26b.

4. Application server 12 uses all available data to ascertain the non-system media file that includes the highest value embedded advertisements relevant to the specific consumer 26b, and redirects the request by non-system application 25 to media server 16 or CDN 15. Media server 16 or CDN 15 delivers the non-system media file, including its embedded advertisements, to non-system application 25.

Ad Logic:

When a request is made to application server 12 for delivery of an advertisement file or a non-system media file, application server 12 determines what file to redirect to. This process weighs all available data to select the highest value file. In addition, application server 12 selects which advertisements to pre-embed in non-system media files, how many of these non-system media files to prepare, and when to refresh them.

The variables assessed by application server 12 include, for example, the latest metrics specified by advertiser 5 and the latest prices advertiser 5 is willing to pay. An individual advertisement at a given moment might yield the highest return but it does not mean this advertisement is the correct one for maximizing overall yield from the inventory of advertisements in system 3. Additional specifications of advertisers are assessed, for example, reach and frequency, as well as the overall supply and demand within system 3. Those skilled in the art are familiar with such systems for optimizing the selection of advertisements within media content.

When application server 12 receives a request for an advertisement from system application 24, the process that application server 12 undertakes is as follows:

1. System application 24 sends a request for an advertisement to application server 12. This request includes the identity of consumer 26a and details of the media content being delivered.

2. Application server 12 uses its evaluation functionality to analyze the available information on the specific consumer 26a, the media content, and the available inventory of advertisements in the system 3 to produce the highest value response.

3. Application server 12 redirects the request of system application 24 to media server 16 or CDN 15.

To ensure that advertisements cached in system application 24 are fresh and of optimal value, system application 24 sends requests for analysis of the cached advertisements to application server 12 at regular intervals. The process by which application server 12 responds to these requests is as follows:

1. System application 24 sends a request for analysis of cached advertisements to application server 12.

2. Application server 12 uses its evaluation functionality to analyze the available information on the specific consumer 26a and the available inventory of advertisements in system 3 to produce the highest value collection of advertisements for caching.

3. Application server 12 compares this collection with the current collection of cached advertisements in system application 24.

4. Application server 12 sends any change instructions, including, for example, files to delete and new files to download to system application 24.

If system application 24 is offline it makes its own selection of advertisement for delivery and can choose from cached advertisements. The evaluation functionality is part of system application 24 and can be refreshed with application updates. The ad logic can be similar or identical to that employed by application server 12. The single step is as follows:

1. System application 24 uses its evaluation functionality to select the highest value cached advertisement.

When producer 4 uploads a media content file that will be available via web feed, application server 12 determines which versions to create in preparation for delivery using non-system application 25. The process is as follows:

1. Producer 4 uses producer portal 7 to upload a media content file and its associated metadata.

2. Application server 12 uses its evaluation functionality to analyze all available data from producer 4 including, for example, the nature of those consumers historically accessing the media created by that specific producer, and the inventory of advertisements in the system.

3. Application server 12 determines how many non-system media files should be created and what advertisements they should include and accordingly adds these requests to the message queue for transcoding cluster 17.

4. Transcoding cluster 17 picks up these requests and processes them.

5. Transcoding cluster 17 stores the new non-system media files on media server 16.

6. Transcoding cluster 17 reports back to application server 12 with the addresses on media server 16 for each of these new non-system media files.

7. Application server 12 stores additional metadata including, for example, consumer targeting parameters and addresses for the non-system media files, in database 13, in key value store 18, and in search engine 20.

System 3 also ensures that for any given version of media content the collection of non-system media files and their various embedded advertisements remains fresh. The process is as follows:

1. Application server 12 regularly polls all non-system media files, running its evaluation functionality to determine the optimal collection of non-system media files and the optimal advertisements to have embedded within them.

2. When the collection of non-system media files available differs from that which is optimal, application server 12 adds tasks for the creation of optimal non-system media files to the message queue for transcoding cluster 17.

3. Transcoding cluster 17 picks up these tasks and processes them.

4. Transcoding cluster 17 stores the new non-system media files on media server 16.

5. Transcoding cluster 17 reports back to application server 12 with the addresses on media server 16 for each of these new files and application server 12 deletes obsolete files from media server 16.

6. Application server 12 stores additional metadata including consumer targeting parameters and addresses for the non-system media files in database 13, in key value store 18, and in search engine 20.

When application server 12 receives a request for a non-system media file from non-system application 25 it selects the optimal version of the non-system media file for delivery to consumer 26b. The process is as follows:

1. Non-system application 25 sends a request to application server 12 for media content. This request comes from a specific internet protocol address that can be used to determine where consumer 26b is located.

2. Application server 12 attempts to collect more information about consumer 26b from CDN 15, which can have additional data, for example, from the mobile carrier of consumer 26b.

3. Application server 12 analyzes the available information on the consumer 26b and the available inventory of non-system media files with their embedded advertising to produce the highest value response.

4. Application server 12 redirects the request by non-system application 25 to CDN 15 or media server 16.

Tracking:

Tracking server 14 is responsible for collecting user data, which includes, for example, information about consumer 26a and consumer 26b and their media consumption behavior. This data is used for reporting to producer 4, advertiser 5, and administrator 6. Additionally, application server 12 and system application 24 use it when calculating the highest value advertisements and media content files to deliver to consumer 26a and consumer 26b.

System application 24 communicates regularly with tracking server 14 when it is connected to network 23 and provides tracking server 14 with user data. When offline, system application 24 stores this data and reports it to tracking server 14 as soon as it is once again connected. The process is as follows:

1. If system application 24 is online it sends all fresh user data to tracking server 14. If system application 24 is offline it reports it to tracking server 14 when it is next online. This data can include, for example, new demographic information about consumer 26a, consumer 26a media consumption locations, consumer 26a media consumption preferences, precise data down to the second about what media content was consumed and when, precise data about what advertisements were consumed and when.

2. Tracking server 14 processes this data and places it in tracking store 19.

The process of collecting data from non-system application 25 is as follows:

1. Non-system application 25 sends a request to application server 12 for a media content file. This request comes from a specific internet protocol address that can be used to determine where consumer 26b is located.

2. Application server 12 attempts to collect more information about consumer 26b from CDN 15, which can have additional data, for example, from the mobile carrier of consumer 26b.

3. Application server 12 uses all available data to ascertain the highest value non-system media file, including its embedded advertisements, for the specific consumer 26b. It then redirects the request of non-system application 25 to media server 16 or CDN 15.

4. Application server 12 reports user data, including which non-system media file was delivered, and with which embedded advertisements, to tracking server 14.

5. Tracking server 14 processes this user data and sends it to tracking store 19.

Advantageously, user data from one or more consumers 26a and one or more consumers 26b is combined to provide an overall picture of media consumption behavior to inform producer 4, advertiser 5, and administrator 6. The method by which this data is combined is discussed in further detail below.

User Data Combination:

FIG. 2 illustrates the method by which the apparatus combines user data from one or more consumers 26a and one or more consumers 26b to provide an overall picture of media and advertisement consumption. This data informs producer 4, advertiser 5, and administrator 6.

FIG. 2 shows a single item of media content 27 that has been pulled from media storage 11, prepared by transcoding cluster 17 and stored in multiple versions on media server 16. For delivery by system application 24, media content file 27a has been prepared in multiple versions with different codec formats and bitrates. However, no version of media content file 27a prepared for system application 24 contains pre-embedded advertisements. For delivery by non-system application 25, media content 27b has been prepared in multiple versions each with its own set of advertisements selected and pre-embedded for targeting at a particular type of consumer 26b. However, all versions of media content file 27b for non-system application 25 are of the same codec format and quality.

When consumer 26a is using system application 24 online and requests media content 27, system 3 assesses details of consumer 26a and other factors relevant to advertisers including, for example, their geographical location, their demographic profile, their interests, the time of day, or the weather in their location at that time. System 3 then selects the best advertisements for consumer 26a, which can include interactive display advertisements. System 3 inserts the advertisements into media content file 27a and delivers the file with its embedded advertisements to consumer 26a via system application 24. If media content file 27a or relevant advertisements are already stored on system application 24 these can be delivered directly from system application 24 rather than from system 3. The exposure of consumer 26a to media content file 27a and it associated advertising is measured with precision by system application 24 and reported back to system 3.

When consumer 26a is using system application 24 offline and requests media content 27, system application 24 assesses details of consumer 26a and other factors relevant to advertisers including, for example, their geographical location, their demographic profile, their interests, the time of day, or the weather in their location at that time. System application 24 then selects the best advertisements for consumer 26a, which can include interactive display advertisements. System application 24 inserts the advertisements into media content file 27a and delivers the file with its embedded advertisements to consumer 26a. The exposure of consumer 26a to media content file 27a and its associated advertising is measured by system application 24 with precision and reported back to system 3 when consumer 26a is next online.

When a consumer 26b is using non-system application 25 and requests media content 27, system 3 assesses the available details of consumer 26b and other factors relevant to advertisers including, for example, internet protocol address location, any relevant information available from CDN 15, and any relevant information available from a mobile carrier. System 3 then selects the non-system media file version of media content file 27b with the highest value advertisements for targeting towards consumer 26b and delivers it to non-system application 25. Non-system application 25 downloads the selected version of media content file 27b for consumer 26b to access. Details of the selected version of media file 20b downloaded and the advertisements embedded within it are recorded by system 3, together with the available details of consumer 26b. System 3 subsequently analyzes this data from non-system application 25 and compares it with the user data that system application 24 has generated concerning the exposure of consumer 26a to the same media content 27. This data illustrates how much and which parts of the media content file 27 a typical consumer is exposed to. System 3 is thereby able to extrapolate consumer exposure data from system application 24 to construct a more precise picture of the consumption of media content and associated advertisements when accessed offline within non-system application 25.

System 3 can therefore collate details of:

1. The types of consumers 26a and 26b that were exposed to media content file 27.

2. Which portions of media content file 27 were accessed with which frequency.

3. Which advertisements consumers 26a and 26b were exposed to with which frequency, regardless of whether consumers accessed the content online or offline.

This data is used to inform producer 4, advertiser 5, and administrator 6. Advantageously, producer 4 can use this detailed information, for example, to influence future content creation. Advantageously, advertiser 5 can use this information to measure exposure to advertisements both online and offline, both within system application 24 and within a third party's non-system application 25. Advantageously, this data is also used by system 3 to inform it about the types of consumer that access each type of media content. System 3 is therefore better able to select the most appropriate advertisements for embedding within each non-system media file.

The reader will see that, according to one embodiment, it has been provided that media content and advertisements can be delivered to consumers over a network with a number of techniques. With some of these techniques, the exposure of consumers to the media and advertisements can be measured precisely. This information can be used to demonstrate consumer exposure to the media content and advertisements when they are accessed using those techniques that do not otherwise provide such precise data. Advantageously, offline consumer exposure to downloaded media content and advertisements can be demonstrated, which significantly increases the attractiveness of downloaded media content to advertisers.

While the above description contains many specificities, these should not be construed as limitations on the scope of any embodiment, but as exemplifications of various embodiments thereof. Many other ramifications and variations are possible. For example, producer portal 7, advertiser portal 8 and administrator portal 9 can be combined into a single interface or web application; artwork storage 10 can be combined with media storage 11, database 13, key value store 18, search engine 20, tracking store 19, and consumer accounts database 22; CDN 15 is an optional element for performance purposes that can be combined with or replaced by media server 16; consumer accounts server 21 can be combined with application server 12, etc. Those skilled in the art will also appreciate that all elements of system 3, with the exception of CDN 15, can reside in a single suitable computer device.

Although described in connection with an exemplary device environment, aspects of the invention are operational with numerous other general purpose or special purpose computing system environments or configurations. The device environment described is not intended to suggest any limitation as to the scope of use or functionality of aspects of the invention. Moreover, the device environment should not be interpreted as having any dependency or requirement relating to any one or combination of elements illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like. Accordingly, the scope should be determined not by the embodiment illustrated, but by the appended claims and their legal equivalents.

The invention claimed is:

1. A method of demonstrating exposure of a plurality of consumers to media content and to advertisements, said method comprising:

a. providing a computer system connected to a network, said computer system being able to render media content and advertisements over said network to a plurality of client devices, said computer system enabling said consumers with said client devices to access media content and advertisements when said client devices are either connected to said network or after said client devices are disconnected from said network, b. providing a system application for said client devices which is able to measure details of said exposure of said consumers to media content and to advertisements both when said client devices are connected to said network and after said client devices are disconnected from said network, said system application being able to render the details to said computer system, c. providing a non-system application for said client devices which is able to measure details of said exposure of said consumers to media content and to advertisements when said client devices are connected to said network, said non-system application being able to render the details to said computer system, d. directing said computer system to render media content and advertisements over said network to said client devices regardless of whether or not said client devices have said system application, e. collecting details of said consumers' exposure to media content and to advertisements from client devices containing said system application and using the details to demonstrate exposure to media content and to advertisements when it is accessed within said client devices that do not contain said system application, wherein if a consumer is offline, an offline routine that is programmed into an interactive display advertisement is triggered, wherein if said system application detects that its connection to said computer system is not sufficient to maintain high quality, it can switch down to a lower quality, which enables ramping at the beginning of media content delivery to reduce launch time, wherein a low quality version is delivered until there is enough of a buffer to deliver media content without disruption, at which point a high quality version takes over; wherein the offline routine includes a simple message to reconnect, or it can offer a series of interactions that can be processed when said client devices are next online.

2. A non-transitory computer readable storage medium storing computer executable instructions for demonstrating exposure of consumers to media content and to advertisements, comprising:

a. a plurality of client devices connected to a network which are able to receive media content and advertisements for access by a plurality of consumers, b. a system application for said client devices which is able to measure details of said exposure of said consumers to media content and to advertisements both when said client devices are connected to said network and after said client devices are disconnected from said network, said system application being able to render the details to said computer system, wherein if consumer is offline, an offline routine that is programmed into an interactive display advertisement is triggered, c. a non-system application for said client devices which is able to measure details of said exposure of said consumers to media content and to advertisements when said client devices are connected to said network, said non-system application being able to render the details to said computer system, d. a computer system connected to said network which is able to:
  1. render media content and advertisements over said network to said client devices regardless of whether or not they have said system application,
  2. render media content and advertisements over said network to said client devices for access by said consumers either when said client devices are connected to said network or after said client devices are disconnected from said network,
  3. collect details of the exposure of said consumers to media content and to advertisements from said client devices that have said system application and use the details to demonstrate exposure to media content and to advertisements when it is accessed from said client devices that do not have said system application, wherein if said system application detects that its connection to said computer system is not sufficient to maintain high quality, it can switch down to a lower quality, which enables ramping at the beginning of media content delivery to reduce launch time, wherein a low quality version is delivered until there is enough of a buffer to deliver media content without disruption, at which point a high quality version takes over; wherein the offline routine includes a simple message to reconnect, or it can offer a series of interactions that can be processed when said client devices are next online, whereby said machine demonstrates said consumers' exposure to media content and to advertisements both when accessed by said consumers when said client devices are connected to said network and when media content and advertisements are downloaded and accessed offline.

3. A method of delivering one or more advertisements within a downloaded item of media content that are targeted at a consumer, said method comprising:

a. providing a computer system connected to a network, said computer system being able to render media content and advertisements over said network to a plurality of client devices, said computer system enabling said consumer with said client device to download media content and advertisements and access it after said client device is disconnected from said network, b. preparing a multitude of versions of an item of media content, each version incorporating one or more different advertisements, c. assessing a profile of said consumer making a download request for the item of media content, d. determining which version of the item of media content incorporates the one or more advertisements that are most relevant to said consumer making the download request, e. delivering for downloading by said consumer the most relevant version of the item of media content with its incorporated one or more advertisements, f. providing a non-system application for said client devices which is able to measure details of exposure of said consumer to media content and to advertisements when said client devices are connected to said network, said non-system application being able to render the details to said computer system, whereby said method delivers one or more advertisements within downloaded media content that are more relevant to said consumer than would be the case if only one version of the item of media content existed, wherein if a consumer is offline, an offline routine that is programmed into an interactive display advertisement is triggered, wherein if said system application detects that its connection to said computer system is not sufficient to maintain high quality, it can switch down to a lower quality, which enables ramping at the beginning of media content delivery to reduce launch time, wherein a low quality version is delivered until there is enough of a buffer to deliver media content without disruption, at which point a high quality version takes over; wherein the offline routine includes a simple message to reconnect, or it can offer a series of interactions that can be processed when said client devices are next online.

* * * * *